Oct. 4, 1955            O. E. WOLFF            2,719,565
PROCESS OF AND APPARATUS FOR MANUFACTURING SPECTACLES
Filed June 8, 1953            3 Sheets-Sheet 1
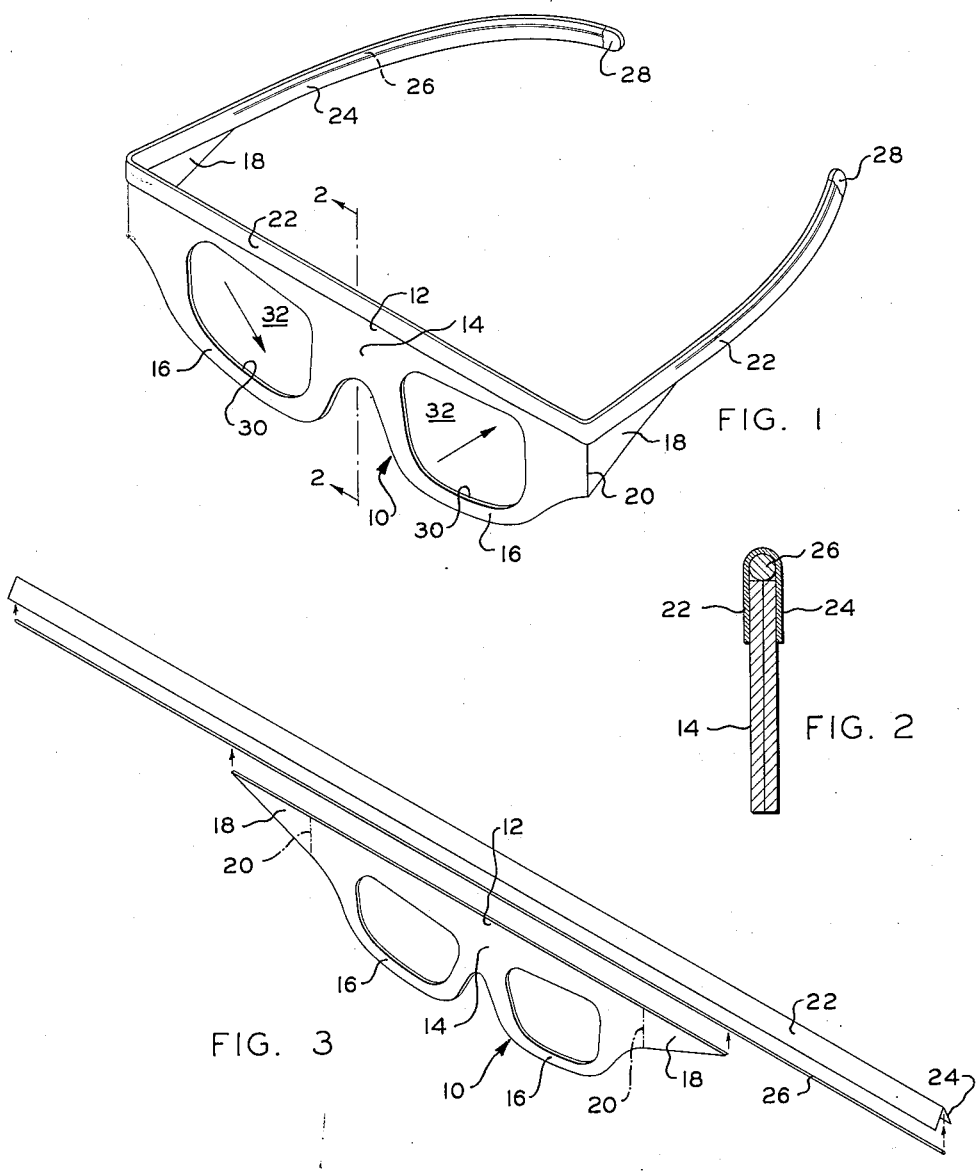
INVENTOR
Otto E. Wolff
BY Browvard Mikulka
and Gerald Altman
ATTORNEYS

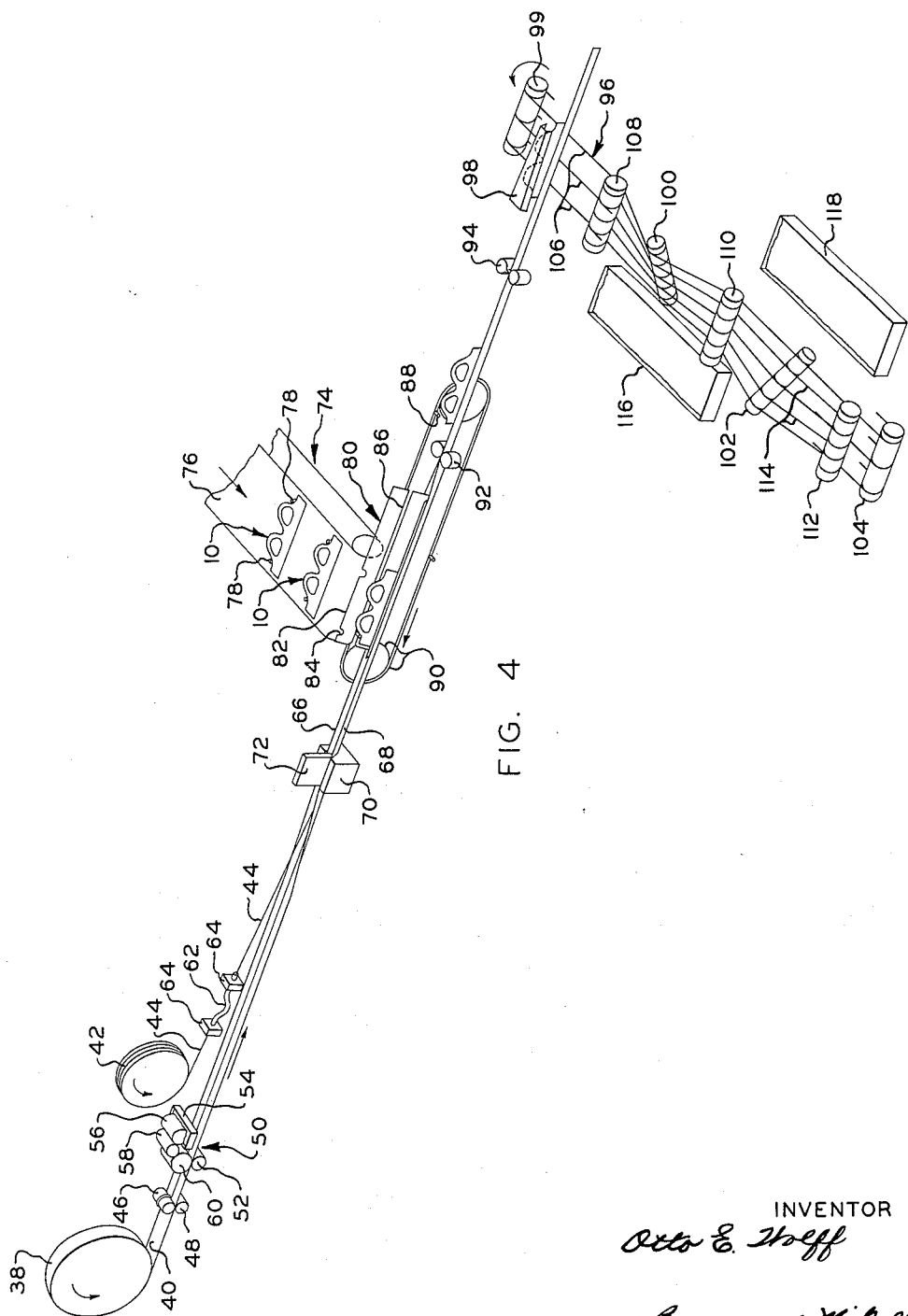

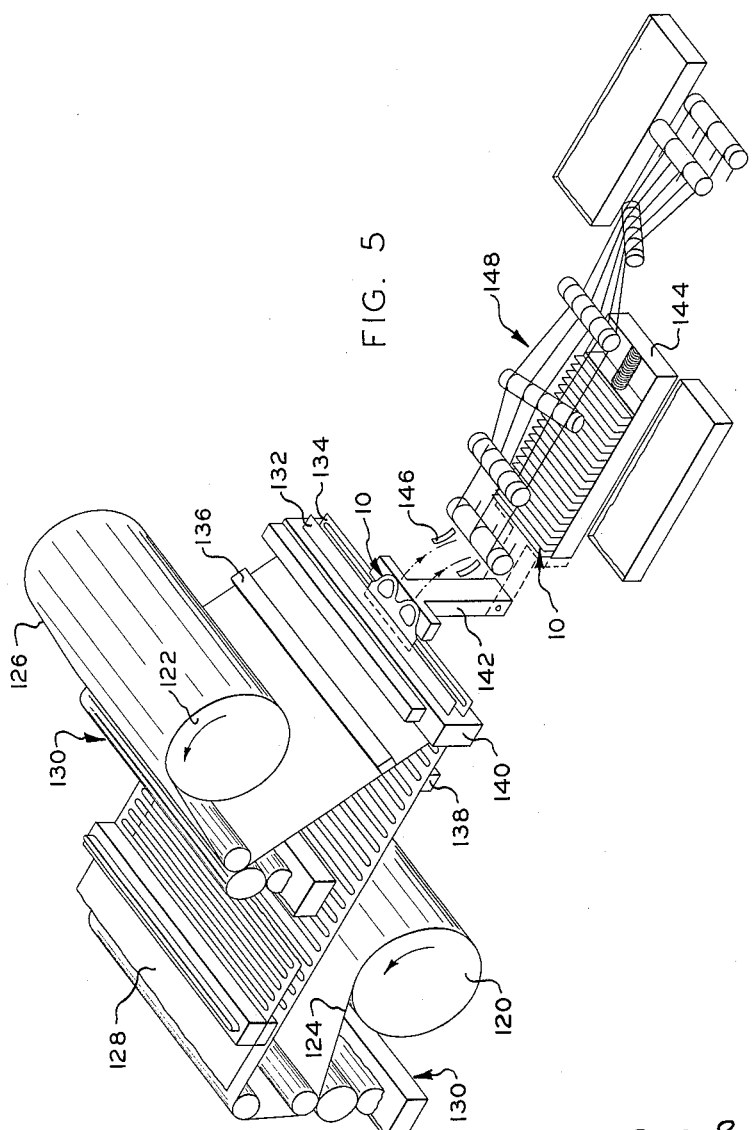

United States Patent Office 2,719,565
Patented Oct. 4, 1955

2,719,565

PROCESS OF AND APPARATUS FOR MANUFACTURING SPECTACLES

Otto E. Wolff, Sudbury, Mass., assignor to Polaroid Corporation, Cambridge, Mass., a corporation of Delaware Application June 8, 1953, Serial No. 360,202

11 Claims. (Cl. 154—1.6)

This invention relates to the manufacture of spectacles and, more particularly, to processes of and apparatuses for assembling the components of inexpensive spectacles of the type commonly employed in the stereoscopic viewing of three-dimensional motion pictures.

It is conventional to provide a pair of spectacles with a pair of differently oriented polarizing windows for enabling the eyes of a wearer to properly observe the images of a stereoscopic pair. The increasing popularity of stereoscopic cinematography, however, has occasioned a demand for spectacles of this type which, although inexpensive to manufacture, have a pleasing appearance and are suitably constructed to permit them to be comfortably seated and readily retained in proper viewing position on the wearer's face.

Objects of the present invention are: to provide processes of and apparatuses for simply and inexpensively manufacturing spectacles of the foregoing type; more particularly, to provide processes of and apparatuses for fabricating spectacles by joining together, solely by adhesive, components which include a frame having a brow portion, a ridge portion and a pair of bow portions on opposite sides of the ridge portion, a pair of elongated strips and an elongated deformable stiffener; and, still more particularly, to provide processes of and apparatuses for fabricating spectacles from components of the foregoing type by applying adhesive to a face of at least one of the strips, disposing the stiffener and the brow portion between this face and a face of the other of the strips, and pressing the faces together.

Other objects of the invention will in part be obvious and will in part appear hereinafter.

The invention accordingly comprises the processes involving the several steps and the relation and order of one or more of such steps with respect to each of the others and the apparatuses possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a perspective view of a pair of spectacles produced by a process and apparatus of the present invention;

Fig. 2 is a cross-sectional view of the spectacles taken along the line 2—2 of Fig. 1;

Fig. 3 is an exploded perspective view showing the components of the spectacles of Fig. 1;

Fig. 4 schematically illustrates a preferred process of the present invention and an apparatus for performing it; and Fig. 5 illustrates another process of the present invention and an apparatus for performing it.

Figs. 1 and 2 illustrate a typical pair of spectacles produced in accordance with the present invention. These spectacles comprise: a frame 10 which includes a brow portion 12, the free edge of which is straight, a ridge portion 14, a pair of bow portions 16 on opposite sides of the ridge portion and a pair of extension portions 18 separated from brow portion 12 by scores 20; a pair of elongated strips 22 and 24, associated edges of the intermediate portions of which overlap brow portion 12 and the opposite end portions of which extend beyond extensions 18 of frame 10 to provide temples; a core or stiffener 26, preferably composed of a deformable metallic material extending between strips 22 and 24 substantially throughout their length; and caps 28, composed of a suitable plastic, which prevent the ends of core 26 from cutting the face of a wearer.

Brow portion 12 and bow portions 16 provide apertures 30 within which a pair of suitable windows or lenses 32 may be retained. In the form shown, windows 32 are polarizers having axes of extinction oriented as indicated by arrows in Fig. 1, composed, for example, of a transparent hydrophilic linear polymeric plastic treated to effect a desired orientation of its molecules and stained with a dichroic dye. A material particularly useful in this connection is polyvinyl alcohol. Materials of the foregoing type are described in detail in U. S. Patent No. 2,237,567, issued to Edwin H. Land on April 8, 1941, for Light Polarizer and Process of Manufacturing the Same, and U. S. Patent No. 2,173,304, issued to Edwin H. Land and Howard G. Rogers on September 19, 1939, for Light Polarizer.

Frame 10, for example, is constructed from a pair of laminated identical stampings between which windows 32, each larger in area than its respective aperture 30, are interposed. These stampings preferably are composed of a relatively stiff sheet material. Strips 22 and 24, which may be either integral with or discrete from each other, preferably are composed of relatively flexible sheet material. Specifically, the stampings and the strips may be composed of such sheet materials, appropriately stiff or flexible, as paper, cardboard or plastic. Core 26 is a wire or strip of a relatively deformable material, for example, a metal such as steel.

The above-described spectacles, because their components are joined solely by adhesive and, consequently, do not require obtrusive staples, rivets, ferrules or the like, are outstanding in appearance. Nevertheless, the spectacles are provided with a deformable core by virtue of which their frame and temples may be bent or twisted into almost any shape their wearer may desire.

Broadly, the process of the present invention contemplates fabricating a pair of spectacles from components of the foregoing type by applying an adhesive to a face of at least one of the strips, disposing the core and the brow portion between this face and a face of the other of the strips, and pressing the faces together.

A preferred specific process and apparatus of the present invention are illustrated in Fig. 4 wherein pairs of spectacles of the above-described type are shown being fabricated from a roll 38 of tape 40, a roll 42 of metal wire 44 and a succession of frames of the type designated by 10 above. Strip 40, advancing from roll 38, is medially scored by a pair of die rollers 46 and 48, of which roller 46 has a medial rib and roller 48 has a medial groove (not shown) for receiving the rib. A layer of glue then is applied to the upper surface of tape 40 by means of a kissing roller assembly 50 which includes a guide roller 52, a glue pot 54, a pickup roller 56, a transfer roller 58 and an applicator roller 60. Wire 44, advancing from roll 42, is fed initially through a wire straightener 62 in the form of a U-tube which rotates in bearings 64. At this point, tape 40 is folded at its score by the V-shaped channel of a block 70 to form, in effect, a pair of integral strips 66 and 68 and wire 44 is directed into the score between the strips by a guide 72 which projects into the V-shaped channel.

The brow portions of a succession of frames 10 are inserted between the adjacent faces of strips 66 and 68 at predetermined intervals by means of a feeder generally designated by 74 and now to be described. Frames 10 are carried by a conveyor 76 provided with a succession of pairs of pins 78, in abutment with which the frames have been placed, toward a chute 80 which is substantially V-shaped in cross section and the apex of which projects between but clear of strips 66 and 68. Chute 80, closely adjacent to conveyor 76, is provided with an edge 82 which scoops the frames from the conveyor and directs their brow portions under gravity toward the apex of the chute. Edge 82 is provided with a pair of notches 84 by virtue of which it clears pairs of pins 78. The wall of chute 80 against which frames 10 come to rest is provided with an elongated slot 86 through which a succession of fingers 88 extend. Fingers 88, which are carried in succession along slot 86 by a chain and sprocket 90, transfer frames 10 from chute 80 into contact with the adjacent faces of strips 66 and 68.

Thereafter, strips 66 and 68 are laminated to each other with the wire 44 and the brow portion of a frame 10 therebetween by a pair of pressure rolls 92. The successive pairs of spectacles so formed are severed at appropriate intervals from succeeding pairs of spectacles and their components by a rotary cutter 94.

A pair of spectacles so formed is directed onto a conveyor 96 by an inverted guide 98 and is caused to fall upon the conveyor by reason of the conveyor's forward motion. Conveyor 96 includes rolls 99, 100, 102 and 104 which drive spring belts 106 and rolls 108, 110 and 112 which drive spring belts 114. The axes of rolls 100 and 102 are so oriented that when a pair of spectacles is advanced between spring belts 106 and spring belts 114, they are rocked in such a manner that their opposite ends are momentarily dipped into a molten plastic carried by vats 116 and 118. The axis of the roll 100 is inclined downwardly toward the vat 116. A pair of spectacles is gripped between the belts 106 and 114 with the temples 22 extending beyond the sides of the aforesaid belts and one temple is thus caused to dip toward and into the vat 116 as the spectacles are advanced by the conveyor 96. The roll 102 is likewise inclined toward the vat 118 on the other side of the conveyor 96. After the spectacles have passed vat 116 and one end of one temple 22 has been coated by dipping into the vat 116 the spectacles are tilted in the opposite direction by the inclination of the roll 102 and the end of the other temple is caused to dip into the vat 118 to coat the temple end with molten plastic.

Another specific process and apparatus of the present invention are illustrated in Fig. 5 wherein pairs of spectacles of the above-described type are shown being fabricated from rolls 120 and 122 of paper sheets 124 and 126, a roll (not shown) of metal sheet 128 and a plurality of cardboard frames of the type designated by 10 above. Sheets 124 and 126, advancing from rolls 120 and 122, are coated with glue by kissing roller assemblies 130, each of which, like assembly 70, includes a guide roll, a cement pot, a pickup roll and an applicator roll. Elongated metal strips are struck from sheet 128 by a punch and are laterally disposed upon successive portions or strips 132 of sheet 124 which, in turn, are advanced into superposed relation with successive portions or strips 134 of sheet 126.

The brow portions of a succession of frames 10 are inserted between the adjacent faces of strips 132 and 134 and the strips are laminated together and severed from sheets 124 and 126 in the following manner. Strips 132 and 134 are fed by a pair of vacuum chucks 136 and 138 into superposed relation within a combined shear and press 140. The metallic strip that has been disposed upon strip 134 now lies between strips 132 and 134. A vacuum picker arm 142 withdraws a frame 10 from a feeder 144 and interposes the brow portion of the frame between strips 132 and 134. Strips 132 and 134 are laminated together with the metallic strip and the brow portion of the frame interposed therebetween and are severed from sheets 124 and 126 by a single stroke of shear and press 140.

A pair of deflector fingers 146 direct the pair of spectacles thus formed from vacuum picker 142 to a conveyor 148 which, like conveyor 96, includes spring belts and rolls adapted to rock the spectacles in such a manner that their opposite ends are momentarily dipped into a molten plastic carried by a pair of vats.

Since certain changes may be made in the above processes and apparatuses without departing from the scope of the invention herein involved, it is intended that all matter contained in the above description or shown in the accompanying drawings shall be interpreted as illustrative and not in a limiting sense.

What is claimed is:

1. The process of fabricating spectacles from components which include a frame having a brow portion, a ridge portion and a pair of bow portions on opposite sides of said ridge portion, a pair of elongated strips and an elongated stiffener, said process comprising the steps of applying an adhesive to a face of at least one of said strips, disposing said stiffener and said brow portion between said face of said one of said strips and a face of the other of said strips, and pressing said faces together about said stiffener beyond the ends of said brow portion to form temples therefor.

2. The process of fabricating spectacles from components which include a frame having a brow portion, a ridge portion and a pair of bow portions on opposite sides of said ridge portion, a pair of elongated strips and an elongated deformable metallic core, said process comprising the steps of applying an adhesive to a face of at least one of said strips, disposing said core and said brow portion between said face of said one of said strips and a face of the other of said strips, and pressing said faces against the opposite surfaces of said brow portion and about said stiffener beyond the ends of said brow portion to form temples for said spectacles.

3. The process of fabricating spectacles from components which include a frame having a brow portion, a ridge portion and a pair of bow portions on opposite sides of said ridge portion, a pair of elongated strips and an elongated deformable metallic core, said process comprising the steps of applying an adhesive to the face of at least one of said strips, disposing said core and said brow portion between said face of said one of said strips and a face of said other of said strips, pressing said faces together, and dipping the opposite ends of said strips and said core into a molten plastic.

4. The process of fabricating spectacles from components which include a frame having a brow portion, a ridge portion and a pair of bow portions on opposite sides of said ridge portion, an elongated tape and an elongated deformable metallic stiffener, said process comprising the steps of applying an adhesive to a face of said tape, medially folding said tape to form a pair of elongated strips the adjacent surfaces of which are coated with said adhesive, disposing said stiffener and said brow portion between said adjacent surfaces of said elongated strips, and pressing said faces together.

5. The process of fabricating spectacles from components which include a plurality of frames, each having a brow portion, a ridge portion and a pair of bow portions on opposite sides of said ridge portion, a roll of tape and a roll of deformable metallic wire, said process comprising the steps of applying an adhesive to a face of said tape, medially folding said tape to form a pair of strips the adjacent surfaces of which are coated with said adhesive, disposing said wire between said adjacent faces, disposing the brow portions of said frames between said adjacent faces at intervals therealong, pressing said faces together in order to laminate said adjacent faces together with said wire and said brow portions therebetween thereby to form successive spectacles, and severing said successive spectacles from succeeding spectacles.

6. The process of fabricating spectacles from components which include a plurality of frames, each having a brow portion, a ridge portion and a pair of bow portions on opposite sides of said ridge portion, a pair of elongated paper sheets and an elongated metallic sheet, said process comprising the steps of applying an adhesive to a face of each of said paper sheets, successively striking elongated strips from said metallic sheet, successively laterally disposing said strips of said metallic sheet upon strips of one of said paper sheets, successively superposing strips of the other of said paper sheets upon said strips of said one of said paper sheets, successively interposing between said strips of said paper sheets brow portions of said frames, successively pressing together strips of said paper sheets so superposed, and severing said strips of said paper sheets so superposed from the remainder of said paper sheets.

7. An apparatus for fabricating spectacles from components which include a frame having a brow portion, a ridge portion and a pair of bow portions on opposite sides of said ridge portion, a pair of elongated strips and an elongated deformable metallic stiffener, said apparatus comprising an applicator for coating a face of at least one of said strips with an adhesive, guides for directing said strips into superposed relation and for disposing said stiffener therebetween, a conveyor for interposing said brow portion of said frame between said strips, and a press for laminating said faces of said strips together with said stiffener and said brow portion therebetween.

8. Apparatus for fabricating spectacles from components which include a plurality of frames, each having a brow portion, a ridge portion and a pair of bow portions on opposite sides of said ridge portion, a roll of tape and a roll of deformable metallic wire, said apparatus comprising means for applying an adhesive to a face of said tape, means for folding said tape to form a pair of strips the adjacent surfaces of which are coated with said adhesive, means for disposing said wire between said adjacent surfaces, means for disposing the brow portions of said frames between said adjacent surfaces at intervals therealong, means for pressing said faces together in order to laminate said adjacent surfaces together with said wire and said brow portions therebetween thereby to form successive spectacles, and means for severing said successive spectacles from succeeding spectacles.

9. Apparatus for fabricating spectacles from components which include a plurality of frames, each having a brow portion, a ridge portion and a pair of bow portions on opposite sides of said ridge portion, a roll of tape and a roll of deformable metallic wire, said apparatus comprising a kissing roller assembly for applying an adhesive to a face of said tape, a guide for folding said tape to form a pair of strips the adjacent surfaces of which are coated with said adhesive, a guide for disposing said wire between said adjacent faces, a feeder for disposing the brow portions of said frames between said adjacent faces at intervals therealong, pressure-applying rolls for laminating said adjacent faces together with said wire and said brow portions therebetween to form successive spectacles, and rotary cutting means for severing said successive spectacles from succeeding spectacles.

10. An apparatus for fabricating spectacles from components which include a plurality of frames, each having a brow portion, a ridge portion and a pair of bow portions on opposite sides of said ridge portion, a pair of elongated paper sheets and an elongated metallic sheet, said apparatus comprising means for applying an adhesive to a face of each of said paper sheets, means for successively striking elongated strips from said metallic sheet and for successively laterally disposing said strips of said metallic sheet upon strips of one of said paper sheets, means for successively superposing strips of the other of said paper sheets upon said strips of said one of said paper sheets, means for successively interposing between said strips of said paper sheets brow portions of said frames, combined means for successively pressing together strips of said paper sheets so superposed and for severing said strips of said paper sheets so superposed from the remainder of said paper sheets.

11. Apparatus for fabricating spectacles from components which include a plurality of frames, each having a brow portion, a ridge portion and a pair of bow portions on opposite sides of said ridge portion, a pair of elongated paper sheets and an elongated metallic sheet, said apparatus comprising a kissing roller assembly for applying an adhesive to each of said paper sheets, a punch for successively striking elongated strips from said metallic sheet and successively laterally disposing said strips of said metallic sheet upon strips of one of said paper sheets, a guide for successively superposing strips of the other of said paper sheets upon said strips of said one of said paper sheets, a feeder for successively interposing between said strips of said paper sheets brow portions of said frames, and a combined shear and press for severing strips of said paper sheets so superposed from the remainder of said paper sheets and for successively laminating together said strips of said paper sheets so superposed.

References Cited in the file of this patent

UNITED STATES PATENTS

| | | |
|---|---|---|
| 2,177,117 | Potdevin | Oct. 24, 1939 |
| 2,601,005 | Ramey | June 17, 1952 |
| 2,665,736 | Boersma et al. | Jan. 12, 1954 |

FOREIGN PATENTS

| | | |
|---|---|---|
| 1,005,015 | France | Dec. 5, 1951 |